(12) United States Patent
Casper

(10) Patent No.: US 6,530,737 B1
(45) Date of Patent: Mar. 11, 2003

(54) CYLINDER TRANSPORTER

(76) Inventor: Benjamin G. Casper, 171 N. Canal Blvd., Basin City, WA (US) 99343

(*) Notice: Subject to any disclaimer, the term of this patent is extended or adjusted under 35 U.S.C. 154(b) by 0 days.

(21) Appl. No.: 09/541,406

(22) Filed: Mar. 31, 2000

Related U.S. Application Data

(63) Continuation-in-part of application No. 09/453,652, filed on Dec. 3, 1999, now Pat. No. 6,413,032.

(51) Int. Cl.[7] .................................................. B62B 1/04
(52) U.S. Cl. ..................... 414/444; 280/47.24; 414/447; 414/449
(58) Field of Search ............................. 414/444, 447, 414/449, 490; 280/47.17, 47.18, 47.24, 47.34, 79.6

(56) References Cited

U.S. PATENT DOCUMENTS

| | | | | |
|---|---|---|---|---|
| 1,866,887 A | * | 7/1932 | Gleason et al. | ............. 414/449 |
| 2,418,522 A | * | 4/1947 | Needham | |
| 2,461,203 A | * | 2/1949 | Evans | |
| 3,170,709 A | * | 2/1965 | Shackel | |
| 3,667,728 A | * | 6/1972 | Garelick | ...................... 414/447 |
| 3,706,461 A | | 12/1972 | Devol | ..................... 280/47.26 |
| 3,815,767 A | | 6/1974 | Lund | ........................... 214/383 |
| 3,873,118 A | | 3/1975 | Takagi | ........................ 280/47.2 |
| 3,913,762 A | | 10/1975 | Alexander | ................... 214/506 |
| 4,136,889 A | | 1/1979 | Middleton | .................... 280/30 |
| 5,080,387 A | * | 1/1992 | Ryals | ........................ 280/47.24 |
| 5,513,939 A | * | 5/1996 | Martin et al. | ................ 414/447 |
| 5,658,118 A | | 8/1997 | Luca | ............................ 414/444 |
| 5,806,868 A | * | 9/1998 | Collins | ......................... 414/449 |
| 6,000,712 A | * | 12/1999 | Wu | .......................... 280/47.34 |

* cited by examiner

*Primary Examiner*—James W. Keenan
(74) *Attorney, Agent, or Firm*—Liebler, Ivey & Connor; Floyd E. Ivey

(57) ABSTRACT

An apparatus comprising a transporter. More particularly this invention relates to an apparatus that can be used to transport a large and heavy cylinder on a frame with easy maneuverability. The apparatus is designed mainly for use with propane cylinders that have legs, whereby the article is not lifted to be place on the transporter, instead the apparatus is slid or placed underneath the article without disturbing it.

3 Claims, 7 Drawing Sheets

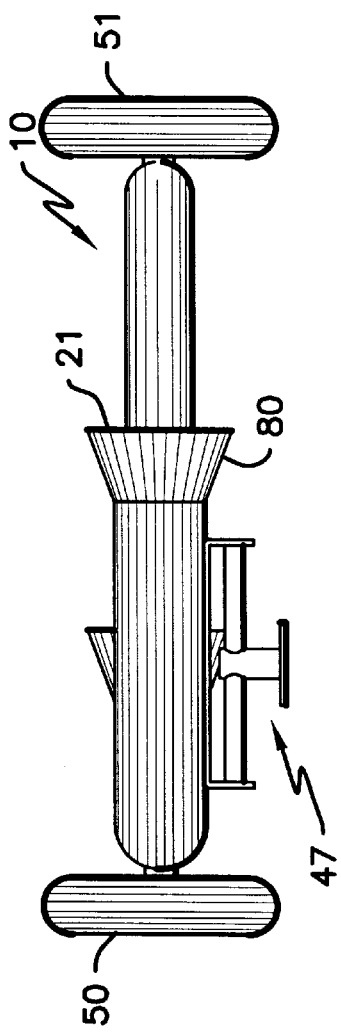
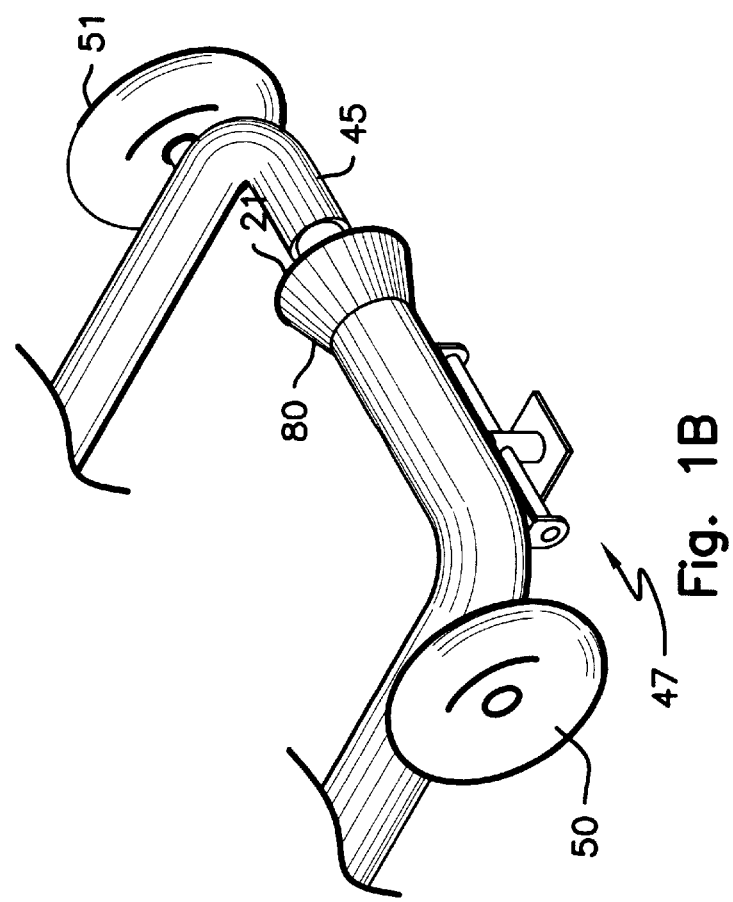
Fig. 1A
Fig. 1B

CYLINDER TRANSPORTER

This patent application is a continuation-in-part of application Ser. No. 09/453,652 filed on Dec. 3, 1999, now U.S. Pat. No. 6,413,032

FIELD OF THE INVENTION

The present invention relates generally to manually operated transporter for the transportation of heavy objects and in particular, to a transporter suitable for the use with large horizontal propane tanks that have legs or are designed whereby a portion of the tank is off the ground.

BACKGROUND OF THE INVENTION

A variety of apparatus' are known in the prior art which are directed toward transporters, hand trucks or wheel barrows. The prior art has disclosed transporters for use with objects that can be lifted to be placed upon the device. However, such devices have not been usable where the object is heavy and large, whereby manual lifting of the object is unduly burdensome because of the object's weight, and/or dimensions.

In the propane industry, the propane tanks or propane cylinders are brought to a site for installation. These cylinders may weigh between 250 to 500 pounds. In order to move a cylinder, the custom of the industry is to have two or three people at a site. Often due to the size and weight of the cylinder, the cylinder is dragged. This dragging is undesirable because of the damage that may be caused to the ground, pavement or the cylinder. Additionally, it is often required that the cylinder be moved through narrow areas such as fence gates, doors or along side a dwelling, it is desirable to have a high degree of maneuverability of the cylinder. In order to have ease of movement of a cylinder without dragging or damaging the cylinder, ground or surroundings, it is desirable to have a cylinder upon a transporter.

It will be further appreciated by those skilled in the art that previously there has been no way to move a propane cylinder at a site without lifting an end of the cylinder manually off the ground, which is a difficult task.

U.S. Pat. No. 3,706,461 to Devol shows a two wheeled wheelbarrow having a frame capable of carrying heavy loads. U.S. Pat. No. 5,658,118 to Luca reveals a device for transporting cylinders and a hook to attach to the cylinder for stabilization. U.S. Pat. No. 3,815,767 to Lund shows a two wheel device for moving a vertically placed drum and the conversion of the device to allow for drainage of the drum. U.S. Pat. No. 4,136,889 to Middleton shows a collapsible trolley, whereby the frame can be adjusted for different purposes. U.S. Pat. No. 3,873,118 to Shozo reveals the addition of a third wheel to convert a carrier for heavier loads. U.S. Pat. No. 3,913,762 to Alexander shows a retractable hook and strap for stabilization.

The patents referred to herein are provided herewith in an Information Disclosure Statement in accordance with 37 CFR 1.97.

SUMMARY OF THE INVENTION

In general it is an object of this invention to provide a transporter which can be employed without lifting the object. An additional object of the invention is to provide a transporter that is simple, easy and rapid to use. An object of the invention is provide a separable transporter, that can be installed at a site. Another object of the invention is to provide a transporter that can be mass produced at a relatively low cost, thereby encouraging its widespread use by the applicable industries, including the propane industry.

Still another object of the invention is to provide a transporter which not only lifts a cylinder off the ground, but additionally provides a high degree of maneuverability of the cylinder. In this regard, the transporter of the present invention lends itself readily to use with cylinders and can be moved with the slightest of effort by the handler. More specifically, an aim of the invention is to provide a transporter for use with cylinders whereby lifting of the cylinder would be burdensome. Another object of the invention is the allow one person to be able to move a cylinder with ease.

It is a further object of the invention to provide a transporter which securely maintains and supports the cylinder upon its frame. The present invention discloses a transporter with a means for attaching to the cylinder. This invention provides for a storage and carrying location for cement blocks. Additionally, it provides for a hook or clamp whereby to hang a tool box. The preferred embodiment of the invention is a frame including a handle and a base with a chain for attaching to or around the cylinder. Another embodiment of the invention is a frame including a handle, a base and an arc-shaped supporting frame wherein the cylinder is lifted onto the supporting frame.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 1A is an elevation from the base of the transporter showing a brace.

FIG. 1B is perspective of transporter showing the base and brace.

DETAILED DESCRIPTION OF THE PREFERRED EMBODIMENT(S)

Figure 1:
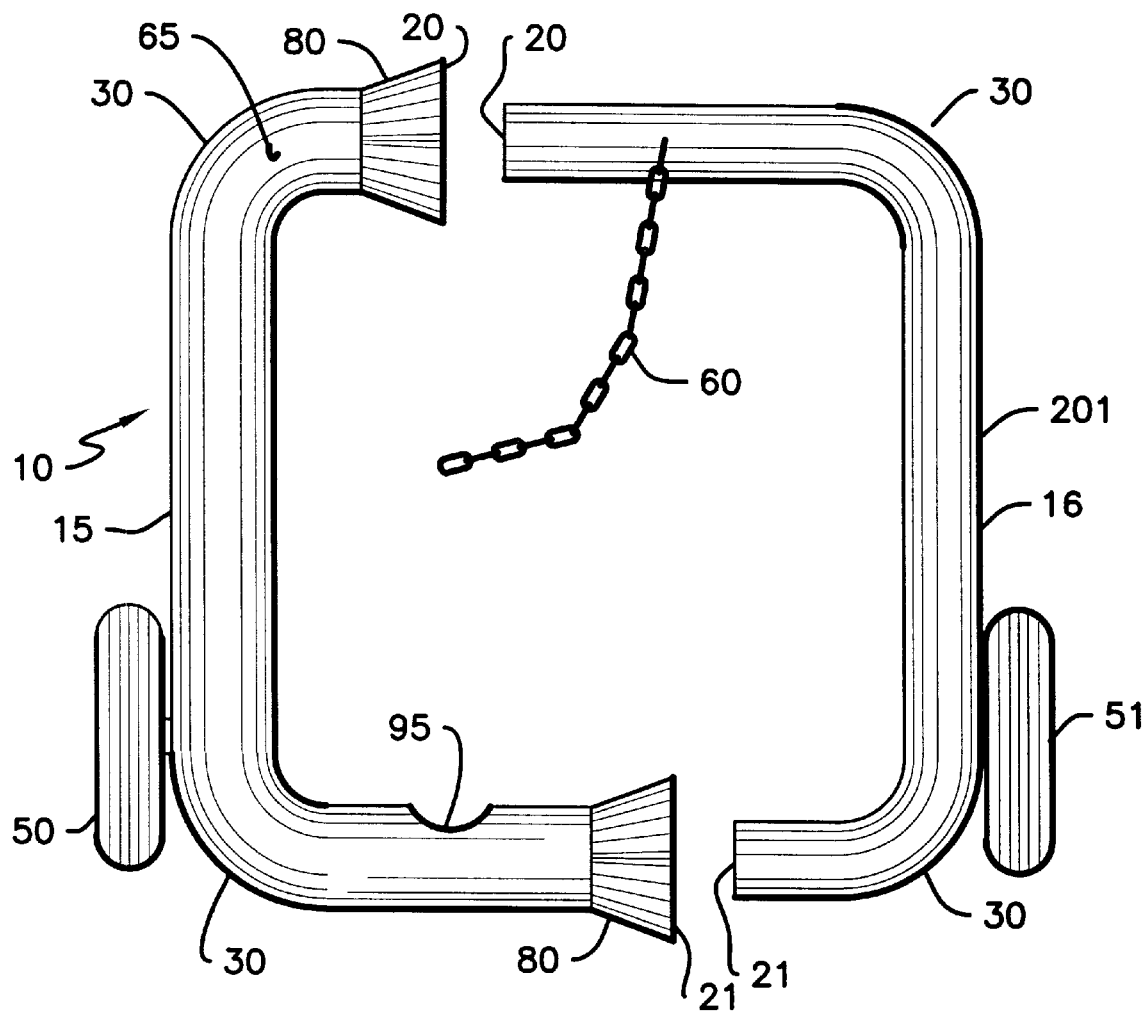
FIG. 1 is a perspective view of transporter showing the elongated members, wheels and securing means. Further shown are the bell joints, attaching means and the depression.
Figure 2:
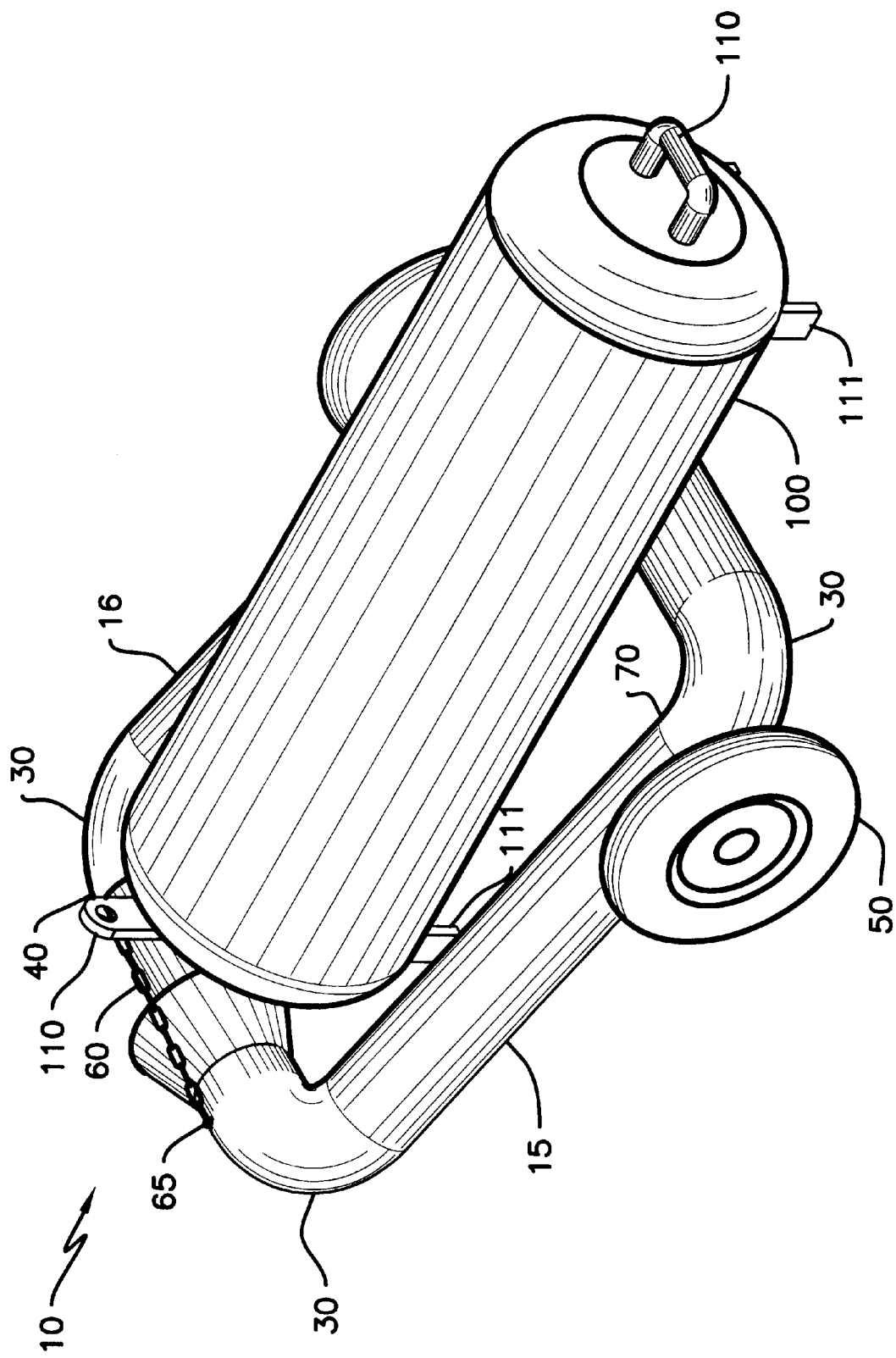
FIG. 2 is a perspective view of the transporter according to the present invention, shown in operation with respect to the cylinder.

The preferred embodiment of the transporter apparatus herein disclosed is depicted in FIGS. 1 through 2. FIG.1 though FIG. 2 illustrate the transporter apparatus 10 which may comprise a frame including at least two elongated members 15, 16 having a first and a second end 20, 21. Each of the elongated members 15, 16 is curved 30 proximal the first end 20 and proximal the second end 21. The first ends 20 are connected by means forming a handle 40 and the second ends 21 are connected by means to form a base 45, whereby the interconnected elongated members 15, 16 share the same plane. The elongated members may be composed of any rigid material, including but not limited to metal or plastic. Additionally, the elongated members may be any shape suitable for constructing a frame, including but not limited to tubular. In the preferred embodiment, the elongated members are made of 1½ inch metal pipe. The first and second ends 20, 21 may be connected by various different means including but not limited to a bell joint, a snap, bolt, clasp, clip or a pin. The connection means should be such to facilitate ease of connection and separation. The connection should not be made by any permanent means such as welding. The preferred connection means is a bell joint connection; when the second ends 21 are connected and the weight of the tank applied on the transporter 10, there is sufficient tension to make an additional connections means unnecessary. In the preferred embodiment, the two elongated members 15, 16 are tubular, wherein one first end 20 and one second end 21 of one of the two elongated members 15 is formed as a bell joint 80, to receive and secure the respective opposing first and second ends 20, 21 of the opposing elongated member 16. Either of the elongated members may have the bell joint. A bell joint is formed when the end of a pipe has a larger diameter for a certain length, then the diameter of the pipe becomes smaller at a point proximal to the end of the pipe. The change in diameter forms an edge such that when the opposite pipe is placed inside it does not extend beyond the edge. This type of bell joint and connection means are well known in the art.

The transporter 10 also comprises at least one wheel 50, 51, affixed by means to each of the two elongated members 15, 16, intermediate the first and second ends 20, 21. These wheels 50, 51 are rotatably attached to the elongated members 15, 16. The wheels 50, 51 may be attached by but not limited to welding, bolts, or screws. It will be appreciated by those in the art the various ways to affix wheels to the elongated members 15, 16. The wheels 50, 51 can be affixed inside or outside the shape of the elongated members 15, 16. When the wheels 50, 51 are affixed inside the elongated member's shape, it would provide a narrower apparatus adding to the ease of maneuverability through narrow passages. This transporter 10 may comprise a securing means 60 affixed intermediate said first and second ends. In the preferred embodiment the securing means 60 is affixed on the handle 40. The securing means 60 could include a chain, rope, bungee cord, elastic, or any other means that would provide securing and support to a cylinder 100. It will be appreciated by those in the art the various securing means for holding a cylinder 100. In the preferred embodiment the securing means is a chain. Propane cylinders 100 are usually equipped with a lifting lug 110, a handle or loop located at the top of each end, whereby the securing means 60 may be fastened to or looped through. This securing means 60 provides easier maneuverability as the cylinder 100 is secure within the transporter 10. The securing means 60 may be adjusted to lift or lower the tank when on the transporter. When the securing means 60 is fastened to the cylinder 100, the cylinder 100 may be pushed or pulled by the handle 40. Alternatively, the cylinder 100 can be pushed or pulled by the front lifting lug 110, which is not attached to the transporter 10.

The apparatus 10 may further comprise an attaching means 65 affixed on the handle 40 whereby the securing means 60 can fasten. The attaching means 65 could be composed of a hook, a snap, a latch, a clamp, or any other securing means. In the preferred embodiment the attaching means 65 is a chain lock or a hook. In the preferred embodiment, the securing means 60 is affixed at one end of the handle 40, and then is placed through the lifting lug and fastened to the attaching means 65 at the opposite end of the handle 40; the securing means 60 forms two sides of a triangle with the handle 40 forming the third side. In this layout the cylinder 100 is more secure on the transporter 10 then alternative layouts and cylinder 100 motion side to side is diminished.

In the preferred embodiment the two elongated members 15, 16 are bent at an obtuse angle 70 to the plane intermediate the handle 40 and the base 45. This obtuse angle 70 can be any obtuse angle that would aid the ease of lifting the cylinder 100.

In the preferred embodiment, one elongated member 15 would be longer than the other elongated member, such the base 45 would be primarily composed from one elongated member 15. The length of the two elongated members 15, 16 is such that the second ends 21 of the respective two elongated members 15, 16 interconnect proximal to a curve 30 of one of the two elongated members 15, 16 and distal from the curve 30 of the other elongated member 15, 16; and a depression 95 is in one of the two elongated members 15, 16 proximal the second ends 21.

In the preferred embodiment, the length of one elongated member 15 must be such that when it is placed on one side of the cylinder 100 it extends under the cylinder 100 and out the opposite side of the cylinder 100 such that the second end 21 is not under the cylinder 100. This will aid the user in aligning the second ends 21 without going underneath the cylinder 100. Additionally, the interconnection is simpler whereby the user can interconnect the second ends 20, 21 beside the cylinder 100. The depression 95 can be but is not limited to a dip, a divot, a bend, a saddle or a dent in one of the elongated members 15. In the preferred embodiment the depression 95 is placed in the center of the base 45 between the two curves 30 such that the cylinder 100 when aligned with the depression 95 during use of the transporter is stable. The depression 95 may also be lined with a non-slip or non-marring material.

Figure 3:
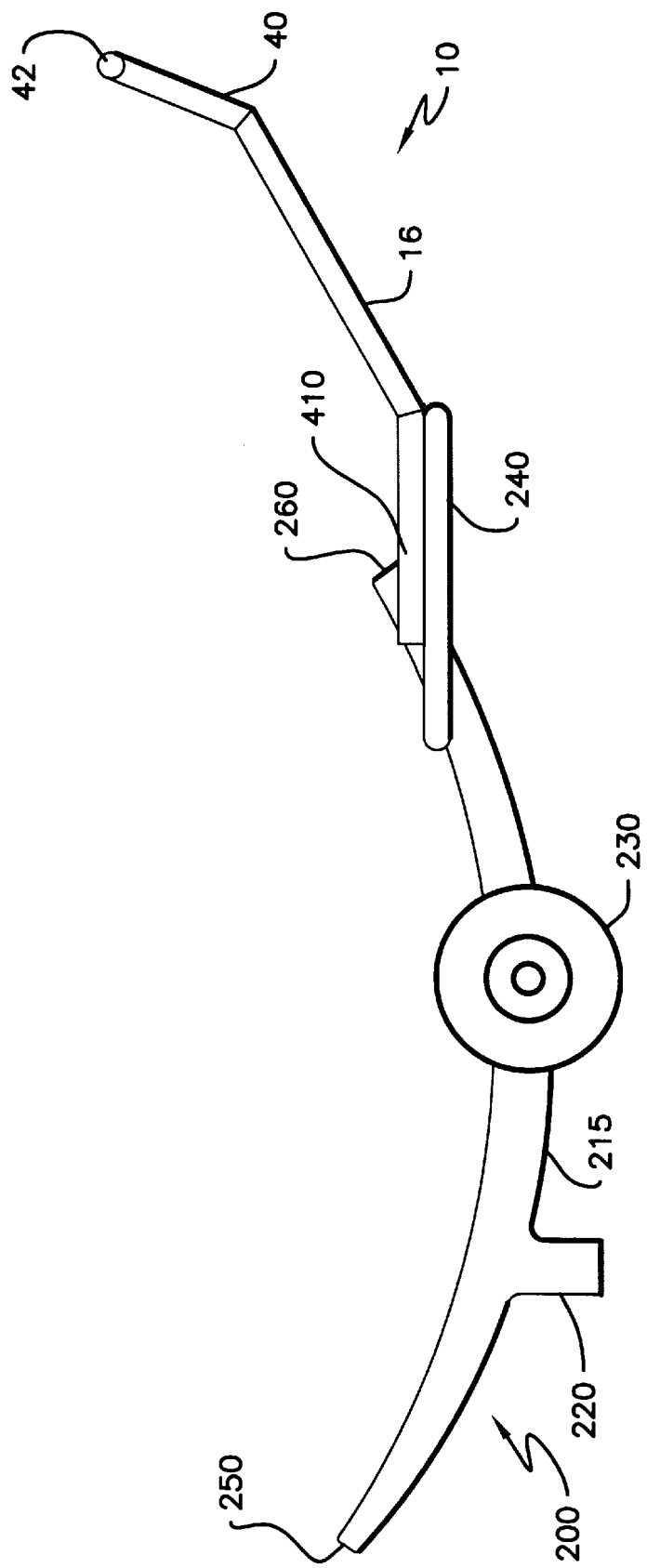
FIG. 3 is a side view of the transporter showing the supporter frame, the elongated member, the arc-shaped side member, the wheel on the side member, the wheel on the elongated member, and the front extension support member and extension support member.
Figure 4:
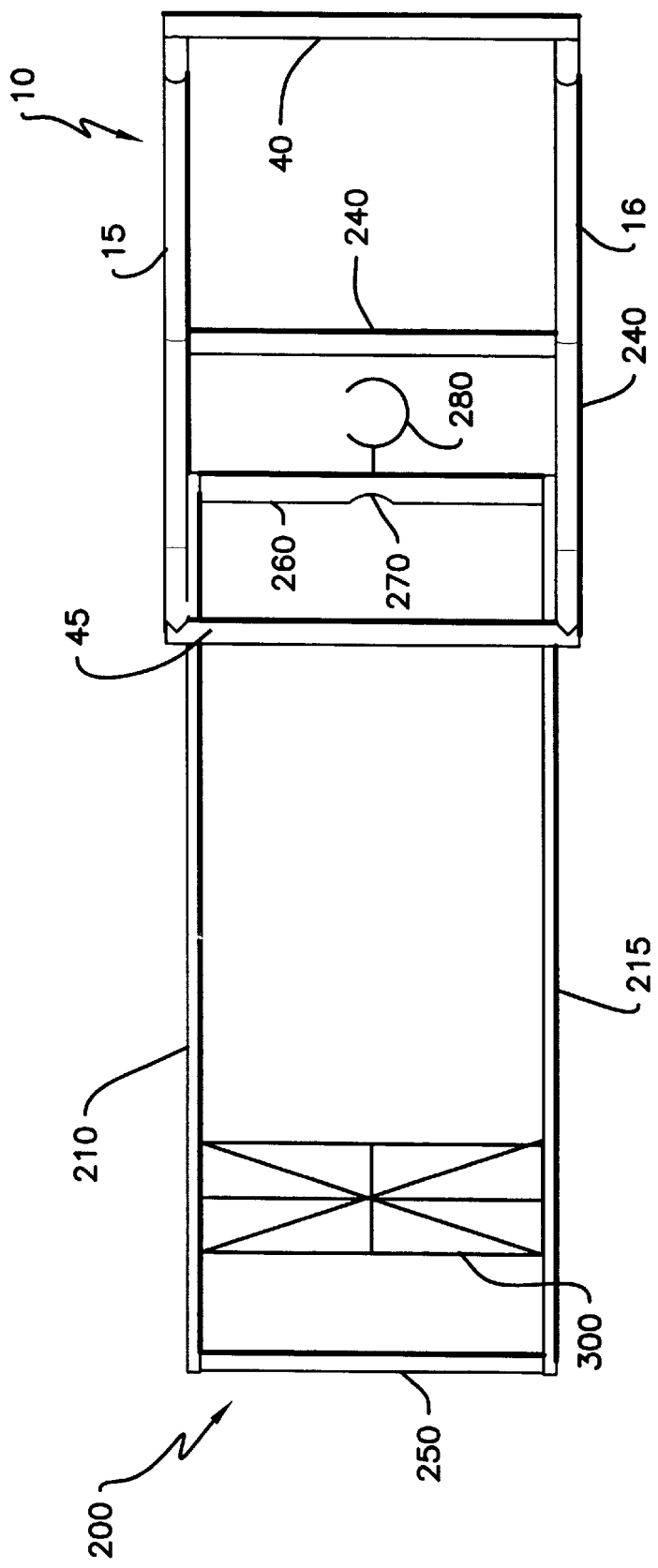
FIG. 4 is a top view of the transporter showing the elongated members, supporter frame, front, rear and side supporter members, extension support member, the hook, the depression, and the carrier means.
Figure 5:
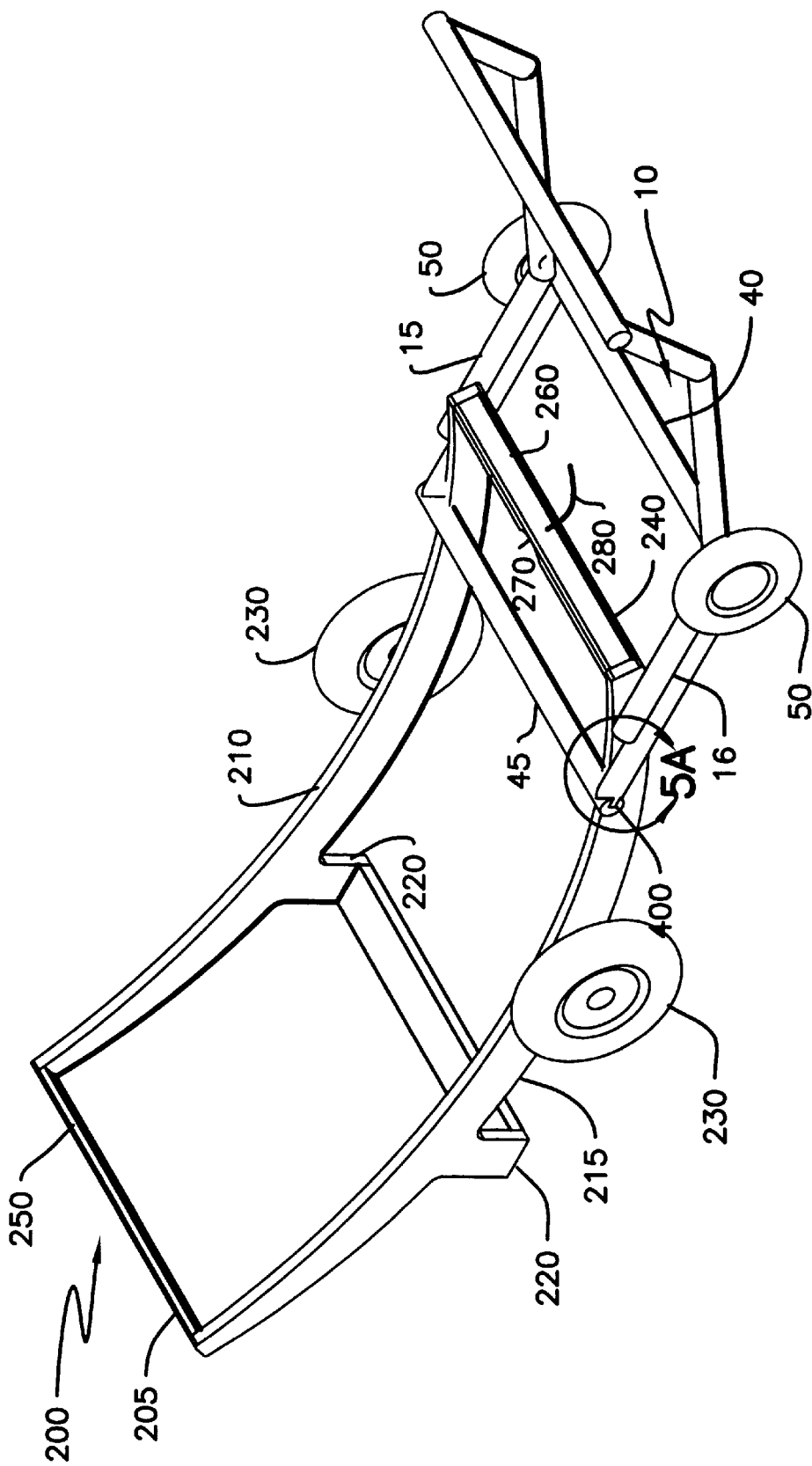
FIG. 5 is a perspective view of the transporter showing the elongated members, wheels, supporter frame, front, rear and side supporter members, and front extension support member and extension support member.

The transporter 10 may also comprise an extension means 42 affixed by means to said handle 40 whereby extending the elongated members 15, 16 to facilitate the movement of heavier tanks if necessary. The extension means 42 could be made from the same material used in the transporter 10 and affixed by permanent, such as welding or any other means, or non-permanent means, such as bolting, clipping or clamping or any other means. As shown in FIG. 3, the extension means 42 could be an elongated member extending from the handle 40. Alternatively, the extension means 42, as shown in FIG. 5 could be an additional handle affixed to handle 40.

Another embodiment of the invention is where the transporter 10 has a brace 47 movably affixed to the base 45. This brace 47 is rotatably affixed to the base 45. This brace 47 can slide beneath a cylinder 100 to provide support to an end of the cylinder 100. The base 45 is positioned beneath a side of a cylinder, and the handle 40 is downwardly lowered. As the cylinder 100 is raised the lever member moves underneath the cylinder 100.

Another embodiment of the invention is where the transporter 10 as originally designed is now removably affixed to a supporter frame 200. FIGS., 3, 4, and 5 depicts the transporter 10 in conjunction with the supporter frame 200. While the preferred embodiment allows a user to maneuver a cylinder 100 through gates and other small areas by carrying the cylinder 100 from an end, such that there is less width, the alternative embodiment allows the user to carry the cylinder 100 from the side of the cylinder 100. Depending on the situation, it may be more useful to carry the tank on a supporter frame 200. The user may use the preferred embodiment to carry the cylinder 100 through a narrow entrance and then the user may attach the support frame 200 to carry the cylinder. The supporter frame 200 includes one support member 205 composed of a front side 250, a rear side 260 and a first and second side 210, 215. The supporter frame 200 has at least one wheel 230, affixed by means to said first and second sides 210, 215 of the support member 205. The supporter frame 200 may be composed of unitary frame structure; or alternatively the supporter frame 200 may be composed of multiple pieces forming the front side 250, rear side 260 and a first and second side 210, 215 that is welded or bolted or otherwise affixed. The supporter frame 200 is sized to receive a propane cylinder 100, such that first and second sides 210, 215 receive and support a cylinder 100. The supporter frame 200 can be made from the same material used to form the elongated members 15, 16. The supporter frame 200 may be made from but is not limited to a rigid material such as metal or plastic including but not limited to tubular structures.

Figure 5A:
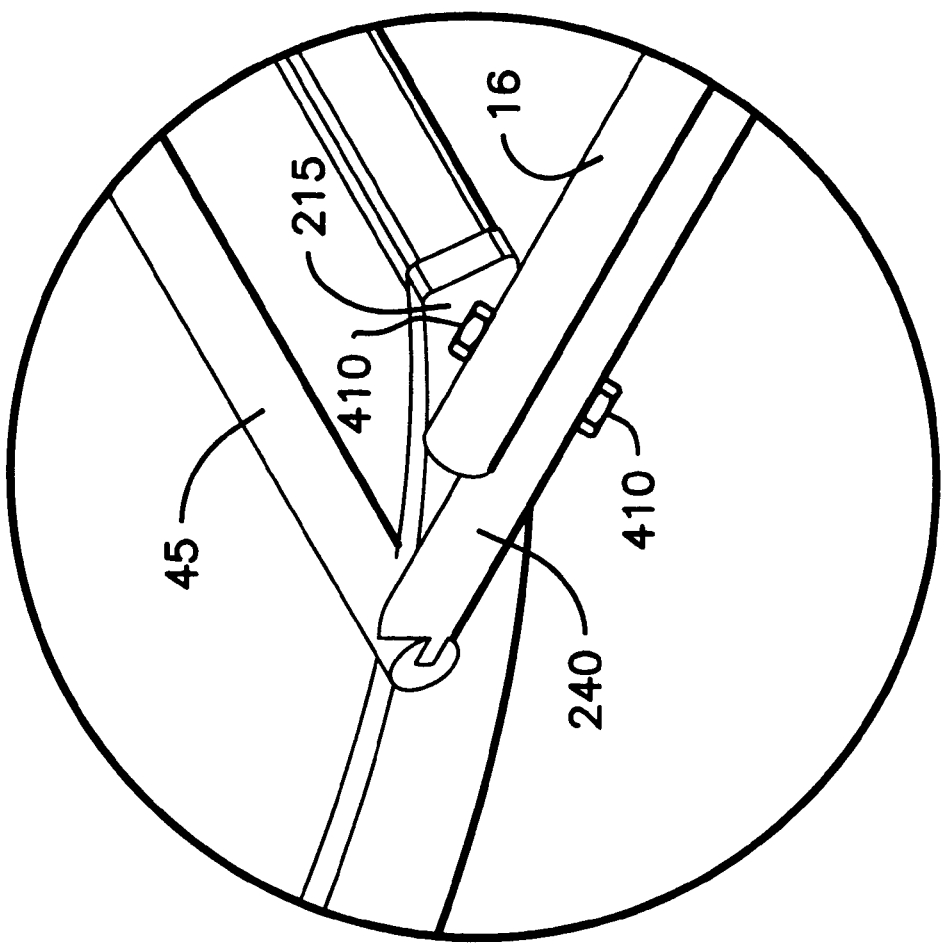
FIG. 5A is a detail from FIG. 5 showing the interconnection between the supporter frame and the transporter.

The means to affix the supporter frame 200 to the transporter 10 may include but is not limited to nuts, pins, snaps, bolts, clasps, clips or any other equivalent means. It will be apparent to those skilled in the art the various means to affix the supporter frame 200 to the transporter 10. Since it is preferred that the supporter frame 200 be removable from the transporter 10, the means should allow the user to easily attach the supporter frame 200 while also providing a strong securing means. The extension support member 240 has apertures 400 proximal the rear side 260 which align with apertures 400 in the elongated members 15, 16 proximal the base 45 as depicted in FIG. 5A as a bolt 410 connection.

In an alternative embodiment of the supporter frame 200 said first and second sides 10, 215 are upwardly curved to form an arc shape. The supporter frame 200 creates a cradle means to hold cylinders 100. The cradle means at the first and second sides 210, 215 may be arc shaped or any other shape that may provide support to a propane tank. The supporter frame 200 may also have a depression 270 on said rear side 260. This depression 270 is an indentation to provide a resting location for a smaller cylinder 100 when transported from the end upright on the supporter frame 200.

The alternative embodiment may also comprise an extension support member 240 affixed to said first and second sides 210, 215 extending outward from the support frame 200. This extension support member 240 has various uses depending on its location on the support frame 200. The extension support member 240 may be affixed proximal said rear side 260. The extension support member 240 is composed of rigid material, for example but not limited to metal or plastic.

When the extension support member 240 is at the rear side 260 of the support frame 200 it is used for applying downward pressure, usually with one's foot, such that support frame 200 pivots either on the wheel 230 or on front extension member 220 located in front of the wheel 230 and the cylinder is lifted onto the support frame 200. In the alternative embodiment there may be at least one front extension 220 affixed to said first and second sides 210, 215 extending downwardly proximal front side 250.

The supporter frame 200 in an alternative embodiment may include a carrier member 300 affixed to said supporter frame 200 between said first and second sides 210, 215. This carrier member 300 may have a typical basket structure with sides and a bottom to support items. The carrier member 300 may be but is not limited to a structure composed of wire. This carrier member 300 should be a rigid material. The carrier member 300 in the alternative embodiment is for carrying structures such as cement blocks which are typically used at a location when placing a propane cylinder.

The supporter frame 200 may have a hook 280 extending outward from said rear side 260. This hook 280 may be an integral part of the supporter frame 200 or an addition added to the supporter frame 200. The hook 280 can be used for a variety of purposes including hanging a tool or a tool carrier thereto. The hook 280 is not limited to any size or shape, but can be any standard hook as known to those in the industry.

Another embodiment of the invention is where the transporter 10 has a brace 47 movably affixed to the base 45. This brace 47 is rotatably affixed to the base 45. This brace 47 can slide beneath a cylinder 100 to provide support to an end of the cylinder 100. The base 45 is positioned beneath a side of a cylinder, and the handle 40 is downwardly lowered. As the cylinder 100 is raised the lever member moves underneath the cylinder 100.

This invention further discloses a method of using the transporter 10 to carry and move an article, comprising the steps of placing one of the second ends 21 under an article; aligning the first and second ends 21 of an opposing elongated member with respective the first and second ends 20, 21; interconnecting the first and second ends 20, 21; applying a downward force on the handle 40 such that the base 45 rises lifting the article; and fastening securing means 60 to the article. In the preferred method, the second ends 21 would be aligned and connected prior to the first ends 20. After frame is constructed, the transporter can be moved to the ideal location under the cylinder 100 prior to fastening the securing means 60.

A method further comprising the steps of aligning the article with the depression 95. This invention is for use with articles that have legs 111 or have a shape whereby a part of the article is off the ground, whereby the article is not lifted, instead the apparatus is slid or placed underneath the article without disturbing it.

Another method of using the transporter 10 with the supporter frame 200 to carry and move an article, comprises the steps of placing the front end 250 under an article and applying a downward force on said handle 40 such that said front end 250 of said at support frame 200 rises lifting the article off the ground Another method of using the transporter 10 with the supporter frame 200 to carry and move an article comprises the steps of placing said front end 250 under an article, applying a downward force on said rear extension support 240 such that support frame 200 pivots on front extension support 220 until support frame rises lifting said article; and holding said handle 40 as said support frame 200 rises lifting the article.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A transporter comprising;
   a. a frame including at least two elongated members each having a first and second end, each of said at least two elongated members is curved proximal said first end and proximal said second end, said first ends of each of the at least two elongated members ate interconnected by means forming a handle and said second ends of each of the at least two elongated members are interconnected by means forming a base; one elongated member of the at least two elongated members is longer than an other of the at least two elongated members, such that the base is primarily composed from one elongated member; the length of the at least two elongated members is such that the second ends of the respective at least two elongated members interconnect proximal to the curve of the one of the at least two elongated members and distal from the curve of the other of the at least two elongated members;
   b. at least one first wheel, affixed by affixing means to each of said at least two elongated members, intermediate said first and second ends;
   c. a supporter frame, removably affixed by affixing means to said frame, said supporter frame including at least one support member composed of a front side, a rear side and a first and second side; and
   d. at least one second wheel, affixed by affixing means to said first and second sides of said at least one support member;
   e. said first and second sides of said at least one support member are upwardly curved such that said at least one support member has an arc shape;
   f. at least two extension support members affixed to said first and second sides.

2. A method of using the transporter of claim 1 to carry and move an article, comprising the steps of:
   a. placing said front side under an article; and
   b. applying a downward force on said handle such that said front side of said supporter frame rises lifting said article.

3. A method of using the transpotter of claim 1 to carry and move an article, comprising the steps of:
   a. placing said front side under an article;
   b. applying a downward force on said rear extension support member such that said supporter frame pivots on said front extension support member until said supporter frame rises lifting said article; and
   b. holding said handle as said supporter frame rises lifting said article.

* * * * *